July 28, 1925.
E. KIBELE
PRESSURE PACKED PISTON
Filed Nov. 20, 1924
1,547,925
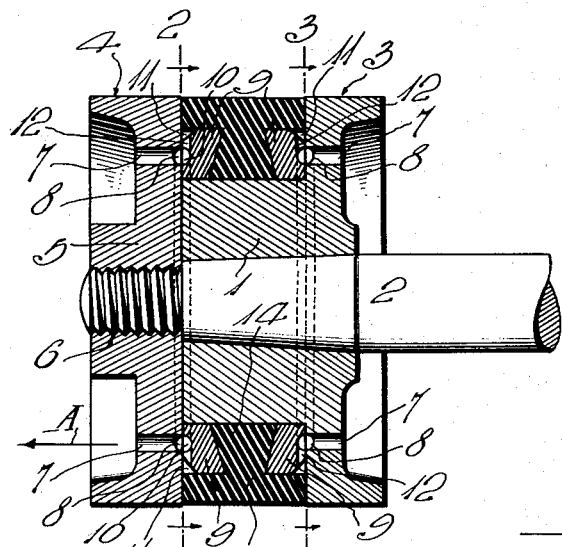
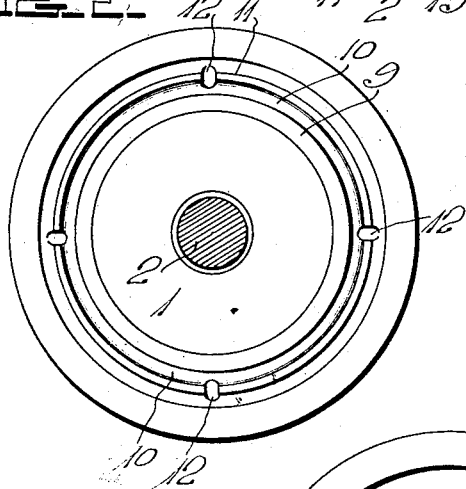
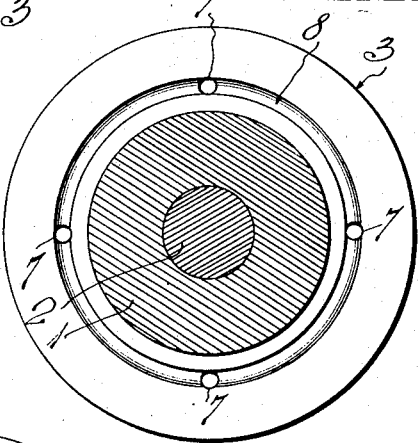
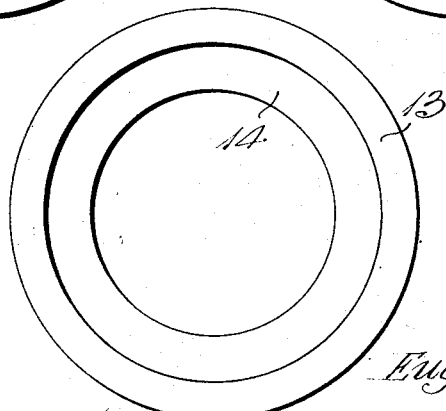
Inventor
Eugene Kibele
Witness
H. Woodard
By H. B. Willson & Co.
Attorneys Patented July 28, 1925.

1,547,925

UNITED STATES PATENT OFFICE.

EUGENE KIBELE, OF SAN ANTONIO, TEXAS.

PRESSURE-PACKED PISTON.

Application filed November 20, 1924. Serial No. 751,173.

*To all whom it may concern:*

Be it known that I, EUGENE KIBELE, a citizen of the United States, residing at San Antonio, in the county of Bexar and State of Texas, have invented certain new and useful Improvements in Pressure-Packed Pistons; and I do declare the following to be a full, clear, and exact description of the invention, such as will enable others skilled in the art to which it appertains to make and use the same.

My invention relates to improvements in pistons of the type in which a packing ring is expanded by pressure from the piston-containing cylinder, so as to at all times hold said ring in tight contact with the cylinder wall, and the invention is intended primarily for use in connection with cold fluid pumps.

It is the object of the invention to provide a simple and inexpensive, yet an efficient and reliable construction, in which unique provision is made for expanding the packing ring, first at one edge portion and then at the other edge portion, as the piston reciprocates.

With the foregoing in view, the invention resides in the novel subject matter hereinafter described and claimed, the description being supplemented by the accompanying drawing.

Figure 1 is a longitudinal sectional view through a piston constructed in accordance with my invention.

Figures 2 and 3 are transverse sectional views as indicated by lines 2—2 and 3—3 of Fig. 1.

Figure 4 is a side elevation of the packing ring.

In the drawing above briefly described, which illustrates the preferred form of construction, the numeral 1 designates a preferably cylindrical body which is adapted to be mounted upon a piston rod 2, the opposite ends of this body being provided with outstanding annular flange members 3 and 4 respectively. The flange member 3 is preferably integral with the body 1, whereas the member 4 is most advantageously formed by the peripheral portion of a ring or follower 5 which may be threaded as at 6, upon the piston rod 2. The two flange members 3 and 4 are provided with ports 7 from their inner to their outer sides, and said inner sides are by preference provided with circumferential grooves 8, registering with said ports.

Slidably surrounding opposite end portions of the body 1 and disposed normally in contact with the inner sides of the flange members 3 and 4 are two duplicate ring members 9 whose outer sides are by preference formed with circumferential grooves 10 registering with the grooves 8, to form an inner pair of continuous, pressure-receiving channels. The outer corners of the ring members 9 are beveled as indicated at 11, to provide outer continuous channels 11, and said ring members are provided in their outer sides with radial grooves or ports 12 which place the inner and outer channels in communication with each other.

Confined between the edge portions of the flange members 3 and 4 and having its edge portions surrounding the ring members 9, is an elastic packing ring 13 which is preferably formed of an excellent grade of rubber. This packing ring is provided with an internal continuous rib 14 which contacts with the body 1 and is clamped between the ring members 9, the contacting faces of said ring members and ribs being preferably beveled as shown, so that a dove-tail formation is provided.

By providing the construction shown and described, or a substantial equivalent thereof, a very efficient and desirable piston is provided. When this piston moves in the direction of the arrow A (Fig. 1) pressure from the cylinder passes through the ports 7 into the channel 8—10 at one end of the piston and passes from this channel through the grooves 12 into the communicating channel 11. This pressure exerts a radial force on one edge portion of the packing ring 13 so as to hold it tightly against the cylinder wall. At the same time, the pressure forces one of the ring members 9 towards the other member so that the rib 14 is compressed and consequently has a tendency to radially expand, thus further forcing the ring into contact with the cylinder wall. This shifting of the ring member 9 also moves the adjacent edge of the packing ring 13 out of contact with the flange member 4, so that pressure may also enter the channels or leave them, through the space between said flange member and packing ring. When the piston moves in the opposite direction, the action just described of course takes place at the opposite end of said piston, so that an extremely tight engagement between the packing ring and the cylinder wall is provided throughout the length of each stroke.

Excellent results have been obtained from the details disclosed and they are therefore preferably followed, but within the scope of the invention as claimed, modifications may of course be made.

I claim:—

1. A pressure packed piston comprising a body having outstanding annular flange members at its opposite ends, said flange members being formed with ports from their outer to their inner sides, a pair of ring members slidable on said body at the inner ends of said ports and having their peripheries spaced inwardly from the peripheries of said flange members, and an elastic packing ring confined between said flange members with its edge portions surrounding said ring members, said packing ring having a continuous internal rib contacting with said body and clamped between said pair of ring members, said rib being adapted to be transversely compressed and thereby radially expanded by the pressure-effected sliding of either of said pair of ring members.

2. A structure as specified in claim 1; the outer corners of said pair of ring members being beveled to form annular pressure receiving channels, at least one of the aforesaid members at each end of the piston being ported to conduct pressure from the first named ports to said channels.

3. A structure as specified in claim 1; the outer corners of said pair of ring members being beveled to form annular pressure receiving channels, said ring and flange members being jointly grooved circumferentially to provide additional channels which register with the aforesaid ports, the outer sides of said ring members having radial grooves from said first named channels to said additional channels.

In testimony whereof I have hereunto affixed my signature.

EUGENE KIBELE.